United States Patent [19]

Parker

[11] Patent Number: 4,953,925
[45] Date of Patent: Sep. 4, 1990

[54] SCANWHEEL ASSEMBLY WITH STRAIN RELIEVED HUB

[75] Inventor: Merle D. Parker, Oceanside, Calif.

[73] Assignee: Hughes Aircraft Company, Los Angeles, Calif.

[21] Appl. No.: 383,826

[22] Filed: Jul. 21, 1989

[51] Int. Cl.⁵ .............................................. G02B 26/10
[52] U.S. Cl. ....................................... 350/6.1; 350/6.5; 350/6.7; 350/6.8
[58] Field of Search ............... 350/6.1, 6.5, 6.7, 6.8; 384/282, 283, 284, 285; 250/236; 358/206

[56] References Cited

U.S. PATENT DOCUMENTS 2,265,065  12/1941  Daywalt et al. ................... 384/282
4,691,998   9/1987  Sakagaito et al. ................ 350/616
4,697,908  10/1987  Ishida et al. ..................... 350/6.8
4,710,036  12/1987  Geczy ............................. 384/285

Primary Examiner—Rodney B. Bovernick
Assistant Examiner—Tho Van Tran
Attorney, Agent, or Firm—Joseph E. Szabo; Wanda K. Denson-Low

[57] ABSTRACT

A strain relieving channel 32 is provided between the hub 31 of a multifaceted scanwheel 15 and the bearing assembly 13 on which the hub 31 is mounted. Compression of the bearing assembly 13 and distortion of the scanwheel facets 29 due to thermally induced compression of the scanwheel web 33 are both reduced by bowing of the hub 31, made possible by the strain relieving channel 32.

8 Claims, 3 Drawing Sheets

SCANWHEEL ASSEMBLY WITH STRAIN RELIEVED HUB

CROSS-REFERENCE TO RELATED APPLICATION

The present invention is related to U.S. patent application Ser. No. 383829, filed on even date herewith by the present inventor, for "Flexible Scanwheel."

BACKGROUND OF THE INVENTION

1. Field of the Invention

This invention relates generally to infrared (IR) scanners and more specifically to multifaceted scanning wheels for such scanners.

2. Description of Related Art

Infrared scanners, to which the present invention relates, typically comprise a multifaceted scanwheel mounted for rotation on a bearing, means for aiming infrared light at the facets as the wheel rotates at high speed and for detecting the light reflected by the facets, and a drive motor and associated drive electronics for spinning the scanwheel at a constant, controlled speed. Important considerations in the design of such scanners is that the scanwheel facets be very precisely oriented relative to the axis of rotation of the wheel, and that the friction encountered by the bearing be as low as possible for minimal power consumption. When such scanners are used in military applications, they are subjected to shock loads up to 100 G and vibration and, hence, must be strong and mechanically stiff, with a resonant frequency above a certain level such as 500 Hz. They also are required to work under extremes of temperature which may range from $-55°$ to $+72°$ C. Low power consumption and minimum weight are frequently additional design requirements. The bearing is usually made of steel for strength, the scanwheel of aluminum for minimum weight. These metals have radically different coefficients of thermal expansion and of conductivity. As a result, when the scanwheel assembly is exposed to expected changes in temperature, stresses are introduced which can result in compression of the bearing, causing increased power consumption and distortion of the scanner wheel facets, degrading optical performance. Measures to isolate the bearing and facets from thermally induced stresses tend to conflict with the need for resistance to shock and vibration. This is so because stress isolation calls for increased flexibility, whereas resistance to shock and a high resonant frequency call for increased stiffness.

SUMMARY OF THE INVENTION

In accordance with the invention there is provided a bearing-mounted scanwheel assembly comprising a bearing assembly and a scanwheel which are configured to permit the hub of the scanwheel to bow when the scanwheel assembly is cooled, thus averting distortion of the scanwheel ∝ s facets as well as distortion of the bearing which might otherwise result. The bearing assembly has an inner member and an outer member mounted for rotation about the inner member, the outer member having a cylindrical outer surface. The scanwheel has a hub with a cylindrical inner surface, with the scanwheel being mounted by its hub upon the outer member of the bearing assembly. In accordance with the invention, either the bearing assembly outer member or the scanwheel hub is provided with a circumferential strain relief channel along the interface between those members. Accordingly, when the scanwheel, and particularly its web, contracts due to a temperature drop, its hub is able to bow, thus accommodating the web's compression without impacting either on the bearing or on the dimensional stability of the facets.

In further keeping with the invention, a plurality of circumferentially distributed axial slots are formed in the hub to impart additional flexibility thereto.

The circumferential strain relief channel may be formed directly in the outer race of the bearing assembly, or there may be provided an intermediate sleeve member between the bearing outer race and the hub, with the strain relief channel being formed in the outer surface of the intermediate member. As another alternative, the strain relief channel may be formed in the inner surface of the hub.

DESCRIPTION OF THE PREFERRED EMBODIMENTS

Figure 1:
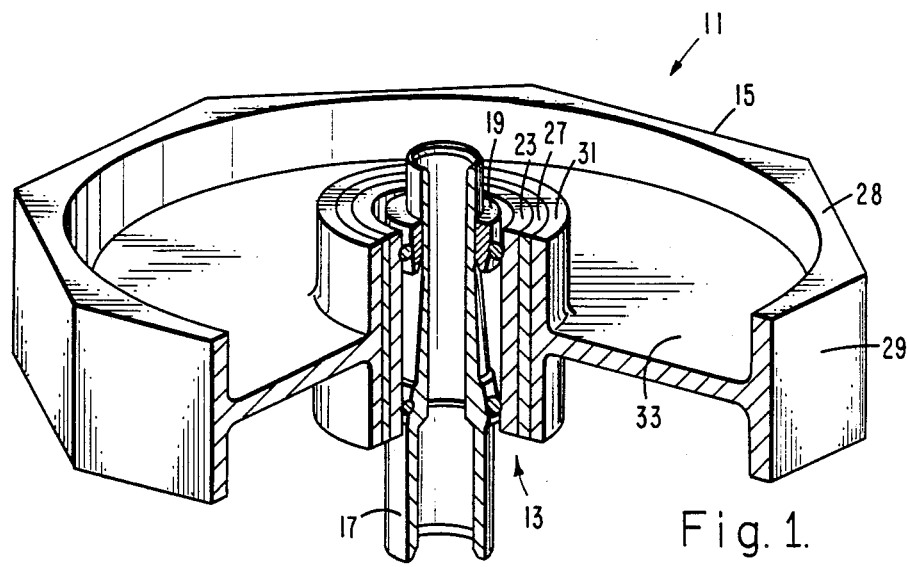
FIG. 1 is a perspective, partially cut away, view of a scanwheel assembly, demonstrating one embodiment of the invention wherein an intermediate sleeve is provided between the scanwheel hub and the bearing outer race.
Figure 2:
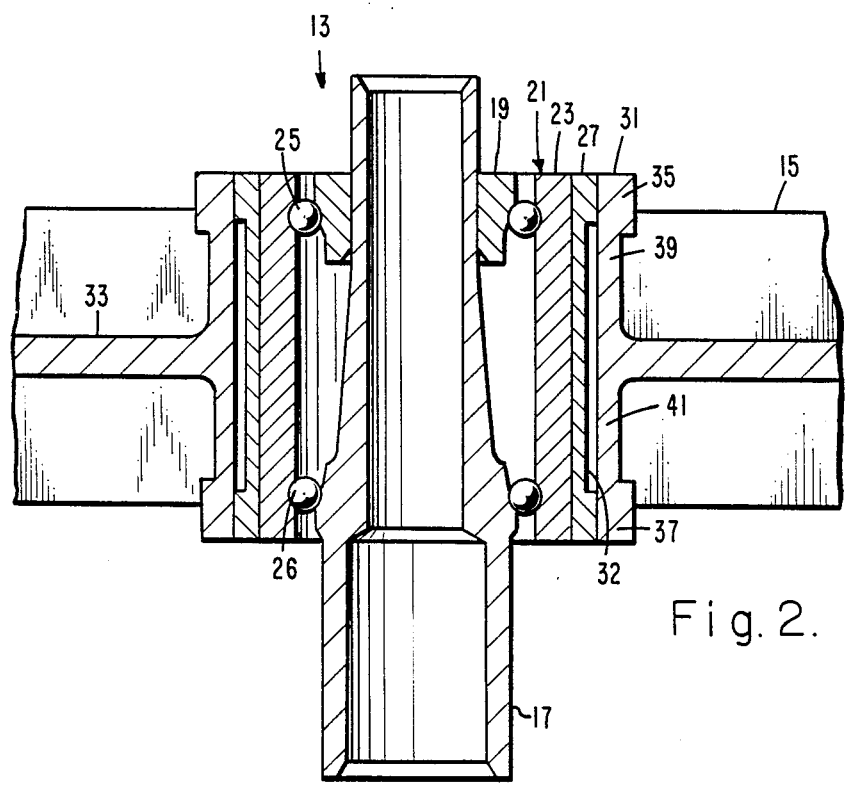
FIG. 2 is a partially cut away cross section through the assembly of FIG. 1, showing more clearly the strain relieving channel in the intermediate sleeve.

FIGS. 1 and 2 depict a scanwheel assembly 11 embodying one approach pursuant to the present invention. For sake of simplicity, other associated parts of the infrared scanner with which such a scanwheel assembly is typically used have been omitted. The assembly 11 comprises a bearing assembly 13 and a scanwheel 15 mounted for rotation upon the bearing assembly. The bearing assembly 13, made typically of steel, comprises an inner member which includes a shaft 17 and an inner race ring 19 fitted onto the tip of the shaft. The bearing assembly 13 further includes an outer member 21 mounted for rotation relative to the inner member elements 17 and 19. It includes an outer race sleeve 23 with spaced-apart grooves which, together with arcuate portions of the shaft 17 and the inner race ring 19, define a pair of spaced-apart raceways in which are distributed first and second sets of bearing balls 25 and 26. An intermediate sleeve 27, having an internal diameter sized to receive the outer race sleeve 23 with an interference fit, is provided according to this embodiment of the invention and is mounted on the outer race sleeve by cooling the latter to shrink it sufficiently to be inserted inside the intermediate sleeve 27, which is typically made of the same material as the sleeve 23.

The scanwheel 15, preferably made of a light metal alloy such as aluminum, comprises a facet ring in the shape of a polygon and having a plurality of highly polished, reflective facets 29 distributed about its periphery. The scanwheel 15 also includes a hub 31 which is symmetrical about the axis of rotation of the scanwheel 15. A web 33 extends between the hub 31 and the facet ring 28. The construction of the web 33 is not shown in detail. Its preferred form is described and claimed in the aforementioned copending application and its disclosure is incorporated herein as if fully set forth. Suffice it to say that it is preferred that the web not be solid as illustrated, but that it be perforated by one or more concentric rows of circumferentially extending slots to make the web flexible and more capable of absorbing thermally induced distortions, and that one such set of slots is preferably formed in the inner wall of a channel formed in the web and running circumferentially approximately midway between the hub 31 and the ring 28.

In further keeping with the invention, the hub 31 is thicker around its ends, as shown at 35 and 37, those regions forming hoops for added strength when the scanwheel, and particularly its hub 31, is thermally interference fitted onto the previously installed intermediate sleeve 27. The remaining, relatively thin hub wall portions 39 and 41 form beam sections extending in opposite directions from the web 33 which is preferably located midway between the hoop sections 35 and 37. This symmetrical construction encourages dimensional stability when the beam comprising the sections 39 and 41 bows into the channel 33.

The width of the strain relief channel 32 is a function of the desired separation between the raceways associated with the first and second set of balls 25 and 26, it being desired that the channel extend substantially between those raceways. Another consideration is the contact area that is desired between the intermediate sleeve 27 and the hub 31. Since the bearing assembly 13 is retained inside the hub 31 by means of an interference fit, the expected temperature excursions during operation of the scanwheel assembly 11 and the extremes of shock which the assembly is expected to withstand determine the total contact area and, hence, the permissible width of the channel 32.

Figure 6:
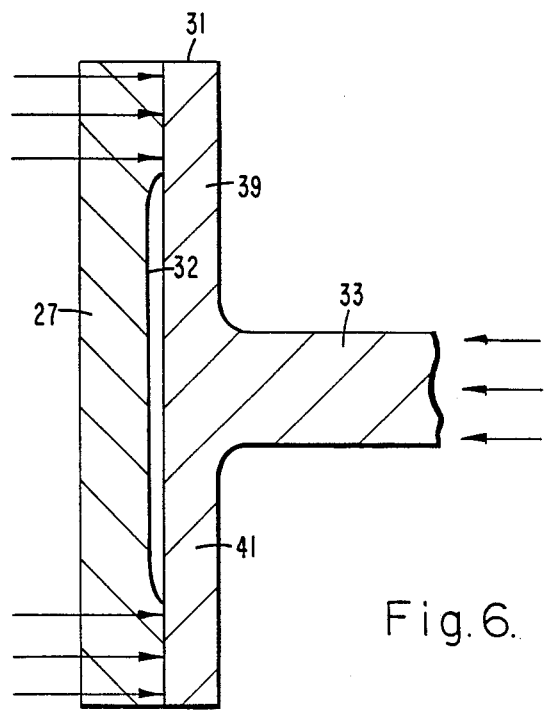
FIG. 6 is a force diagram illustrating the distribution of forces on the scanwheel of the embodiment of FIGS. 1 and 2.

The forces which are imposed on the hub 31 in the course of assembly are illustrated in FIG. 6. The first step in assembling the scanwheel assembly 11 is to increase the internal diameter of the hub 31 relative to the external diameter of the intermediate sleeve 27, accomplished by expanding the scanwheel 15 or shrinking the intermediate sleeve 27, or both, which is accomplished by heating the scanwheel 15 or cooling the intermediate sleeve 27 or both. Following the foregoing step, the intermediate sleeve 27 is inserted into the hub 31 and the two parts are allowed to come to a common temperature. As this occurs, the hub 31 will contract or the intermediate sleeve 27 will expand, or both, until an interference fit is accomplished. Next, the internal diameter of the intermediate sleeve 27 is precisely machined to receive the outer race sleeve 23 in an interference fit. Then the scanwheel 15 and the intermediate sleeve 27 are heated and, if necessary, the outer race sleeve 23 is cooled until the latter fits into the former in an interference-free condition, at which point the outer race sleeve 23 is inserted into the intermediate sleeve 27 and the scanwheel 15 and sleeves 27 and 23 are allowed to come to a common temperature. The forces illustrated by pointed arrows in FIG. 6 are those which are imposed on the hub 31 during and after these interference fitting steps. It may be seen, then,, that when these steps are completed, cooling of the scanwheel 15 causes the facet ring 28 to contract in diameter, putting the web 33 in compression, causing the hub 31 to assume a slight bow or bulge (not shown) which extends into the channel 32. Subsequent temperature excursions to which the assembly may be subjected can be accommodated by bowing of the central portion of the hub 31 into and out of the channel 32, reducing compressive forces on the web 33 and minimizing the distortion of the bearing assembly as well as that of the facets 29.

Figure 3:
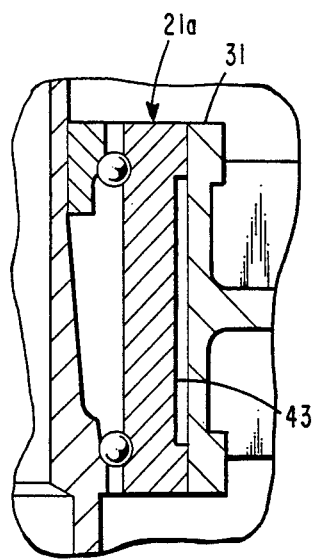
FIG. 3 is a partially cut away cross section through a second embodiment, which is a modification of that shown in FIG. 1, wherein the strain relieving channel is formed in the outer race sleeve of the bearing.

The embodiment illustrated in FIGS. 1 and 2 is intended primarily where it is undesirable to form the strain relief channel 32 in the outer race sleeve 23. However, where it is possible to have access to the outer race sleeve 23, it may be desirable to dispense with the intermediate sleeve 27 and to machine a channel directly into the outer race sleeve. That expedient is illustrated in FIG. 3 where the outer member 21a of the bearing assembly 13 is shown to comprise a single element having a circumferentially extending strain relief channel 43 therein.

Figure 4:
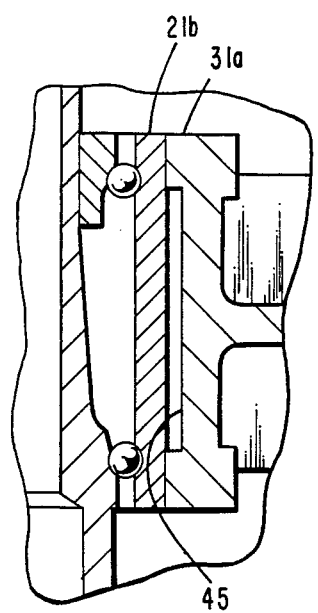
FIG. 4 is a second modified embodiment wherein the strain relieving channel is formed in the inner wall of the scanwheel hub.

The intermediate sleeve 27 may also be disposed with without altering the outer race sleeve 23 by forming the strain relief channel not in the outer member of the bearing assembly 13, but rather on the inside surface of the hub. This expedient is illustrated in FIG. 4 where the hub 31a is shown with a circumferentially extending strain relief channel 45.

In all three cases the particular thickness and configuration of the hub 31 or 31a may be tailored to meet the required stiffness for the scanwheel assembly. For example, it may be required that the cylindrical hub remain stiff enough to resonate above 500 Hz and that it withstand a given shock load without damage. These requirements can be met with the proper configuration of the hub which is made stiff enough to meet the resonant frequency and shock resistance requirements while at the same time remaining flexible enough to undergo the bowing made possible by the present invention.

Figure 5:
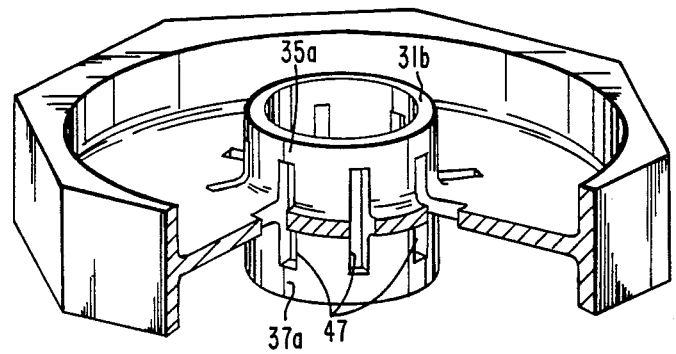
FIG. 5 is a perspective partially cut away view of a scanwheel which may be made in accordance with either of the embodiments of FIGS. 1 through 4, and which, in addition, includes a plurality of circumferentially distributed axial slots in the hub.

Provision of the strain relief channel also serves to minimize the flow of heat between the bearing assembly 13 and the scanwheel 15. Heat flow between those elements may be further reduced by additionally reducing the contact area between the bearing assembly 13 and the hub 31 where it is not required. This may be achieved, as shown in FIG. 5, by cutting or otherwise forming a plurality of circumferentially distributed axial slots 47 around the hub 31.

Axial slots 47 are terminated at their opposite ends within the confines of the strain relief channel 32 so that the remaining hoop portions 35a and 37a remain unaffected as would also the contact area between the bearing assembly 13 and the sleeve 31b. An additional benefit conferred by provision of the axial slots is that they reduce the resistance of the hub to bowing and, hence, permit the hoop to flex into the channel 32 under lower stress than would otherwise be the case. In effect, provision of the slots 47 converts the hub 31 from a cylinder subjected to hoop stress around its midplane, to a series of circumferentially distributed axial beams subject to bending. The bending moment of inertia and dynamic response of the axial beams can be readily tailored to desired levels by altering the width of the axial slots between them.

There has been described a scanwheel assembly which can withstand temperature extremes with greatly reduced distortions in its central bearing assembly, which might raise power consumption, and in its facet ring, which might be detrimental to optical performance, without compromising the stiffness of design necessary to meet requirements of resistance to shock and high resonant frequency. Several modifications have been disclosed; others may occur to those skilled in the art without departing from the scope of the invention which is defined in the following claims.

What is claimed is:

1. A bearing mounted scanwheel assembly comprising in combination:
   (a) a bearing assembly having an inner member and an outer member mounted for rotation about said inner member, said outer member having a cylindrical outer surface;
   (b) a scanwheel having a hub with a cylindrical inner surface, said scanwheel being mounted by its hub upon said outer member; and
   (c) a circumferential strain relief channel in one of said surfaces.

2. The scanwheel assembly of claim 1 wherein said outer member consists of the outer race of said bearing assembly.

3. The scanwheel assembly of claim 1 wherein said outer member comprises an outer race sleeve and an intermediate sleeve within which said outer race sleeve is fixedly received, said intermediate sleeve having a cylindrical outer surface, and said circumferential strain relief channel extending along the outer surface of said intermediate sleeve.

4. The scanwheel assembly of claim 1 wherein said strain relief channel is in the outer member of said bearing assembly.

5. The scanwheel assembly of claim 1 wherein said strain relief channel is in the inner surface of said hub.

6. The scanwheel assembly of claim 1 or 2 or 3 or 4 or 5 wherein a set of axial slots extend through said hub.

7. The scanwheel assembly of claim 1 or 2 or 3 or 4 or 5 wherein said bearing assembly comprises a spaced-apart pair of raceways, with said strain relief channel extending substantially between said raceways.

8. The scanwheel assembly of claim 6 wherein said axial slots are centrally disposed between the ends of said hub and symmetrically distributed about the circumference of said hub.

* * * * *